United States Patent
Kaya et al.

(10) Patent No.: US 7,011,891 B2
(45) Date of Patent: Mar. 14, 2006

(54) RUBBER PRODUCT SURFACE TREATING METHOD

(75) Inventors: Hiroyuki Kaya, Atsugi (JP); Takashi Sugai, Atsugi (JP); Yousuke Yamada, Atsugi (JP)

(73) Assignee: Regitex Co., Ltd., Atsugi (JP)

( * ) Notice: Subject to any disclaimer, the term of this patent is extended or adjusted under 35 U.S.C. 154(b) by 0 days.

(21) Appl. No.: 10/310,796

(22) Filed: Dec. 6, 2002

(65) Prior Publication Data

US 2003/0190490 A1   Oct. 9, 2003

(30) Foreign Application Priority Data

Apr. 1, 2002   (JP) .............................. 2002-098335

(51) Int. Cl.
*C08L 63/00*   (2006.01)

(52) U.S. Cl. ......................................... 428/492; 525/31

(58) Field of Classification Search .................. 428/492
See application file for complete search history.

(56) References Cited

U.S. PATENT DOCUMENTS 5,895,713 A * 4/1999 Miyazaki et al. ........... 428/335

FOREIGN PATENT DOCUMENTS

| JP | 3-49230 A | | 3/1991 |
|---|---|---|---|
| JP | 2000-044708 A | * | 2/2000 |

OTHER PUBLICATIONS

JPO Abstract Translation of JP 2000-044708 A (Doc. ID: JP 2000044708 A).*
Machine Translation of JP 2000-044708 A.*
English Translation of Okikura et al. (JP 12-044708) (DOC ID: PTO 04-2290).*

* cited by examiner

*Primary Examiner*—Kevin M. Bernatz
(74) *Attorney, Agent, or Firm*—Foley & Lardner LLP

(57) ABSTRACT

By causing a rubber product to be immersed into or coated with a treating liquid prepared by adding hydrogen peroxide and other additives such as surfactant, alcohol, thickening agent, other surface tension depressant into an aqueous acetic acid or formic acid solution, it becomes possible to efficiently epoxidize the surface layer of the rubber product to thereby provide the rubber product surface with non-adhesive property, sliding property and other barriering properties, without causing toxic gases and contamination due to powder dust during the manufacturing process and without deteriorating properties inherent in the rubber product such as elasticity, elongation and tensile strength.

18 Claims, 1 Drawing Sheet

RCO$_3$H

RUBBER PRODUCT SURFACE TREATING METHOD

TECHNICAL FIELD OF THE INVENTION

The present invention relates to a surface treating method for providing a surface of a rubber product with non-adhesive property, sliding property, and other barriering properties.

BACKGROUND ART

Conventionally, methods for providing a surface of a rubber product with non-adhesive property, sliding property, and other barriering properties such as an anti-blooming property include ones: (1) for addition reacting halogen such as chlorine; (2) for attaching powders such as silica, talc, and corn starch; (3) based on a surface coating such as silicone, fluoroplastics, urethane resin, hydrogel polymer; (4) based on surface modification such as by particular organic acid, inorganic acid, plasma etching, corona discharge treatment; (5) based on surface purification by a solvent treatment; and (6) based on surface extraction by warm water, minute alkali, and acid solution.

Although the method (1) is effective for providing the non-adhesive property and sliding property, there are left such problems of: the deteriorated working environment due to the toxic gas; waste water treatment; and separation of halogen from completed products.

Although the method (2) is frequently adopted as the most general method, there has been pointed out a pollution problem due to powder dust such as during an operation process or upon usage, and particularly, the pollution due to the powders cause various infectious diseases in a medical field, while leaving in fields of precision machine and electronic components such a problem that the powders lead to defective products thereby causing defective adhesion in an adhesion process, for example.

The method (3) is to exemplarily coat a different type of polymer onto a surface of a rubber body via complicated processes, thereby leaving a problem that the nature and physical properties inherent in the rubber is affected or the coating is likely to be dropped out.

The method (4) has a problem of a large-sized processing facility and a complicated treatment process, while the methods (5) and (6) noway allow to expect a sufficient effect in view of the purpose of provision of non-adhesive property and sliding property. Further, there is also left a problem that the composite surface such as by using halogen or with a different type of polymer leads to an increased total cost, because of the recent necessity of separation or classification accompanying to waste of materials and to incineration disposal.

Thus, the present applicant has developed a rubber product surface treating method by virtue of formic acid or acetic acid and hydrogen peroxide (Japanese Patent No. 3,049,230), as a method for solving the problems due to the above-mentioned methods (1) through (6).

According to the rubber product surface treating method of the Japanese Patent No. 3,049,230, there is used a treating liquid, which is an aqueous solution prepared by adding hydrogen peroxide into an aqueous acetic acid or formic acid solution and in which the concentration of the aqueous acetic acid or formic acid solution is in a range of 0.5 to 20 wt. % and the mole ratio of hydrogen peroxide/acid is in a range of 1.0 to 30, so as to epoxidize a part of double bonding portions of natural rubber or other diene based synthetic rubbers as represented in a chemical formula of FIG. 1, thereby enabling to provide a rubber product surface with non-adhesive property, sliding property and other barriering properties.

As a method for epoxidizing a double bond between carbons, it is known to adopt a peroxy acid of an organic compound, represented by a general formula of $RCO_3H$. It includes performic acid, peracetic acid, perbenzoic acid and overphthalic acid. Simply immersing a rubber product in peroxy acid such as a peracetic acid aqueous solution (such as aqueous solution on the order of 1 to 4%) fails to provide a rubber product surface with a sufficient sliding property, and causes the rubber surface to be washed within the aqueous solution so that the adhesion property is rather strengthened. Further, trying an effective reaction at a peroxy acid concentration of 4% or more causes such a phenomenon of cracks on the rubber surface, thereby considerably deteriorating the physical properties of the rubber product.

As such, in the rubber product surface treating method of the Japanese Patent No.3,049,230, there is blended an excessive peroxide in a certain range of mole ratio to acetic acid or formic acid so as to cause the minimum organic acid to efficiently function, thereby allowing to epoxidize the surface layer of the rubber product to thereby provide it with non-adhesive property, sliding property and other barriering properties, without deteriorating the physical properties of the rubber product even in the presence of the peroxy acid of 1 to 4% or more.

In the rubber product surface treating method of the Japanese Patent No. 3,049,230, the epoxidation of the rubber surface is readily conducted. However, it is still desired to efficiently conduct a treatment in a shorter time, for practical use such as in factories.

The present applicant has thus found that the efficiency of epoxidation reaction can be improved in a shorter time by adopting a blended treating liquid of the present invention.

DISCLOSURE OF THE INVENTION

The rubber product surface treating method of the present invention is to provide a rubber product surface with non-adhesive property, sliding property and other barriering properties by epoxidizing a part of double bonding portions of natural rubber or synthetic rubbers of conjugated diene copolymer as shown in FIG. 1, by treating the surface of the rubber product by: an aqueous treating solution prepared by adding hydrogen peroxide into an aqueous acetic acid or formic acid solution, in which the concentration of the aqueous acetic acid or formic acid solution is in a range of 21 to 80% and the mole ratio of hydrogen peroxide/acid is in a range of 0.1 inclusive to 1.0 exclusive, desirably 0.2 to 0.5; or an aqueous treating solution additionally blended with 0 to 5 wt. %, desirably 0.001 to 2 wt. % of surfactant, alcohol, thickening agent, other surface tension depressant for the purpose of improving wettability of the aqueous treating solution onto the rubber surface.

It has been found that the epoxidation reaction can be improved according to the rubber product surface treating method of the present invention: by surface treating the unvulcanized or vulcanized rubber product by an aqueous treating solution prepared by adding hydrogen peroxide into an aqueous acetic acid or formic acid solution at such a relatively high concentration in a range of 21 to 80% in which the mole ratio of hydrogen peroxide/acid is in a range of 0.1 inclusive to 1.0 exclusive, desirably 0.2 to 0.5; or by blending, into the aqueous treating solution, 0 to 5 wt. %, desirably 0.001 to 2 wt. % of surfactant, alcohol, thickening agent, other surface tension depressant for the purpose of improving wettability and permeability of the aqueous treating solution onto and into the rubber product surface.

Further, according to the rubber product surface treating method of the present invention, the processing reaction rate is increased to thereby improve the efficiency of the surface treatment by adopting, as additives: surfactant such as sodium pyrophosphate, sodium tripolyphosphate, alkylbenzene sulfonic acid, dialkyl sodium sulfosuccinate, polyoxyethylene alkyl aryl ether, polyoxyethylene nonyl phenyl ether; alcohol such as methanol and ethanol; and fluorine based surfactant; which are capable of improving wettability, permeability of the aqueous treating solution onto and into the rubber and capable of serving as a post-treatment stabilizer, respectively.

BEST MODE FOR CARRYING OUT THE INVENTION

Figure 1:
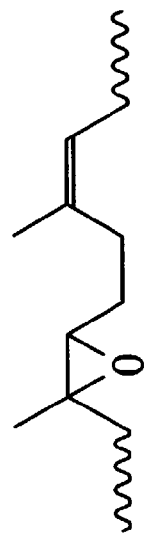
FIG. 1 is a chemical formula representing a state where a part of double bonding portions of natural rubber or other diene based synthetic rubbers is epoxidized.
Figure 1:
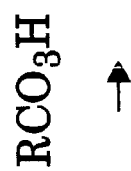
Figure 1:
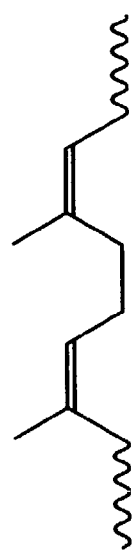

There will be explained hereinafter an embodiment of the present invention.

Films prepared from a vulcanization blend of the following natural rubber latex were immersed in or coated with the blended treating liquids set forth in the embodiments, respectively, to thereby obtain rubber films each having a uniformly epoxidized surface layer.

| Natural rubber latex blend for immersion: | |
|---|---|
| natural rubber latex | 100 dry wt. parts |
| sulfur | 1 dry wt. part |
| zinc oxide | 1 dry wt. part |
| vulcanization accelerator PX | 0.8 dry wt. parts |
| antioxidant | 1 dry wt. part |

Embodiment 1

| Treating liquid blend: | |
|---|---|
| formic acid (76%) | 40 wt. % |
| hydrogen peroxide solution (35%) | 32 wt. % |
| distilled water | balance wt. % |

Embodiment 2

| Treating liquid blend: | |
|---|---|
| formic acid (76%) | 40 wt. % |
| hydrogen peroxide solution (35%) | 32 wt. % |
| sodium tripolyphosphate | 0.2 wt. % |
| distilled water | balance wt. % |

Embodiment 3

| Treating liquid blend: | |
|---|---|
| formic acid (76%) | 40 wt. % |
| hydrogen peroxide solution (35%) | 16 wt. % |
| NEWREX (TM) Paste H | 0.2 wt. % |
| (manufactured by NOF Corp.) | |
| distilled water | balance wt. % |

Embodiment 4

| Treating liquid blend: | |
|---|---|
| formic acid (76%) | 40 wt. % |
| hydrogen peroxide solution (35%) | 16 wt. % |
| NEWREX (TM) Paste H | 0.2 wt. % |
| (manufactured by NOF Corp.) | |
| distilled water | balance wt. % |

Embodiment 5

| Treating liquid blend: | |
|---|---|
| formic acid (76%) | 40 wt. % |
| hydrogen peroxide solution (35%) | 8 wt. % |
| PELEX (TM) OT-P | 0.3 wt. % |
| (manufactured by Kao Corp.) | |
| distilled water | balance wt. % |

Embodiment 6

| Treating liquid blend: | |
|---|---|
| formic acid (76%) | 40 wt. % |
| hydrogen peroxide solution (35%) | 16 wt. % |
| PELEX (TM) OT-P | 0.3 wt. % |
| (manufactured by Kao Corp.) | |
| distilled water | balance wt. % |

Embodiment 7

| Treating liquid blend: | |
|---|---|
| acetic acid (98%) | 40 wt. % |
| hydrogen peroxide solution (35%) | 32 wt. % |
| EMULGEN (TM) 913 | 1 wt. % |
| (manufactured by Kao Corp.) | |
| distilled water | balance wt. % |

Embodiment 8

| Treating liquid blend: | |
|---|---|
| acetic acid (98%) | 40 wt. % |
| hydrogen peroxide solution (35%) | 16 wt. % |
| EMULGEN (TM) 913 | 1 wt. % |
| (manufactured by Kao Corp.) | |
| distilled water | balance wt. % |

Comparative Example 1

| Treating liquid blend: | |
|---|---|
| acetic acid (98%) | 10 wt. % |
| hydrogen peroxide solution (35%) | 40 wt. % |
| distilled water | balance wt. % |

Comparative Example 2

| Treating liquid blend: | |
|---|---|
| acetic acid (98%) | 10 wt. % |
| hydrogen peroxide solution (35%) | 40 wt. % |
| PELEX (TM) OT-P | 0.1 wt. % |
| (manufactured by Kao Corp.) | |
| distilled water | balance wt. % |

Comparative Example 3

| Treating liquid blend: | |
|---|---|
| sodium hypochlorite (15% Cl) | 2 wt. % |

| Treating liquid blend: | |
|---|---|
| concentrated hydrochloric acid | 1 wt. % |
| distilled water | balance wt. % |

Comparative Example 4

Talc powder was applied onto a surface of the rubber film.

[Treatment Process]

Rubber films based on the above natural rubber latex blend were produced by the following processes (Table 1) and the surfaces of the films were then treated by the embodiments 1 through 8 and comparative examples 1 through 4, respectively, to thereby obtain rubber film samples.

TABLE 1

| Manufacturing Process | Embodiment 1 to 8 | Comparative Example 1 to 2 | Comparative Example 3 | Comparative Example 4 |
|---|---|---|---|---|
| 1 | Dip of rubber product into latex | | | |
| 2 | vulcanization and drying (90° C. × 60 minutes) | | | |
| 3 | mold release | | | |
| 4 | water extraction | | | |
| 5 | epoxidation | epoxidation | chlorination | powder application |
| 6 | drying (80° C. × 40 minutes) | | | |

The following Table 2 shows surface treatment conditions and results of the embodiments 1 through 8 and comparative examples 1 through 4, and the following Table 3 shows physical properties of the embodiments 1 and 6 and the comparative examples 3 and 4.

TABLE 2

| | Embodiment | | | | | | | | Comparative Example | | | |
|---|---|---|---|---|---|---|---|---|---|---|---|---|
| | 1 | 2 | 3 | 4 | 5 | 6 | 7 | 8 | 1 | 2 | 3 | 4 |
| Temperature ° C. of immersive liquid | 50 | 18 | 18 | 30 | 50 | 18 | 18 | 50 | 50 | 18 | — | — |
| Treating time (min) | 60 | 180 | 120 | 60 | 20 | 60 | 120 | 60 | 60 | 120 | 5 | — |
| Sliding property (°) | 32 | 32 | 32 | 32 | 32 | 32 | 34 | 34 | 32 | 32 | 32 | 30 |
| Surface gloss | ○ | ○ | ○ | ○ | ○ | ○ | ○ | ○ | ○ | ○ | (A) | (B) |
| Adhesion property | 400 mm or more | | | | | | | | | | | |
| Number of days up to surface blooming | 30 or more | | | | | | | | | | 10 | — |

Note: (A) = "Δ to x"; (B) = "bloomed, x".

In the Table 2, the testing method of sliding property was to place each sample onto a stand capable of freely changing its tilting angle such that a weight of 2 g is placed onto the sample to thereby measure an angle at which the sample slides down the stand. The testing method of adhesion property was based on a Rolling Ball Tack Test of JIS Z0237. The number of days up to surface blooming means the number of days up to the time when the rubber surface is bloomed under a ventilated and shadedly exposed condition at a temperature of 30° C. and a humidity of 70%.

TABLE 3

| General physical properties conforming to JIS K6301 | Embodiment | | Comparative Example | |
|---|---|---|---|---|
| | 1 | 6 | 3 | 4 |
| 100% modulus (Mpa) | 0.7 | 0.7 | 0.7 | 0.7 |
| 300% modulus (Mpa) | 1.2 | 1.1 | 1.1 | 1.1 |
| 500% modulus (Mpa) | 2.2 | 2.3 | 2.0 | 2.2 |
| 700% modulus (Mpa) | 11.0 | 9.5 | 9.7 | 9.5 |
| Tensile strength (Mpa) | 32.5 | 30.5 | 30.0 | 32.0 |
| Elongation (%) | 950 | 960 | 920 | 940 |

Although the above embodiments have been surface treated by immersing rubber products into the blended liquids, respectively, it is also possible: to coat the blended liquid onto a rubber product surface such as by a brush, spatula or spray; or to limitingly treat a whole or part of a rubber surface by a method for increasing a thickness of coated amount of the blended liquid, by adopting a thickening agent such as methyl cellulose.

According to the present invention as described above, it becomes possible to efficiently provide a rubber product surface with a non-adhesive property, sliding property and other barriering properties by epoxidizing double bonding portions of molecules at surfaces of natural rubber and other diene based synthetic rubber products, by means of peroxy acid with a relatively simple processing facility and inexpensive raw materials, without deteriorating elasticity, elongation and tensile strength inherent in rubber products.

Further, according to the method of the present invention, there are never caused toxic gases and contamination due to powder dust during the manufacturing process, thereby enabling to remarkably improve the working environment.

Moreover, epoxidizing the rubber product surface layer has exemplarily improved wear resistance, chemical resistance, gas permeation resistance, wet gripping ability, surface gloss and film transparency, and has exemplarily provided persistency of the latter two aesthetic characteristics.

The invention claimed is:

1. A surface treating method for providing a surface of an unvulcanized or vulcanized rubber product with non-adhesive property, sliding property, and other barrier properties, comprising the step of:
    surface treating the rubber product so as to epoxidize a surface layer of the rubber product, by an aqueous treating solution prepared by adding hydrogen peroxide into an aqueous acetic acid or formic acid solution, in which the concentration of the aqueous acetic acid or formic acid solution is in a range of 21 to 80 wt. % and the mole ratio of hydrogen peroxide/acid is in a range of 0.1 to 0.29, and in which said aqueous treating solution is blended with 0.001 to 5 wt. % of a surface tension depressant.

2. A surface treating method of claim 1 for a rubber product,
    wherein said surface tension depressant comprises a surfactant, an alcohol or a thickening agent.

3. A surface treating method of claim 1, wherein the mole ratio of hydrogen peroxide/acid is 0.2 to 0.29.

4. A surface treating method of claim 1, wherein the aqueous solution comprises 0.001 to 0.2 wt. % of a surface tension depressant.

5. A method according to claim 1, wherein the aqueous solution comprises 40 wt. % of an aqueous acetic acid or formic acid solution, 8 to 32 wt. % of a hydrogen peroxide solution, and 0.2 to 1 wt. % of a surface tension depressant.

6. A method of treating a surface of an unvulcanized or vulcanized rubber product, comprising:
    epoxidizing a surface layer of the rubber product by treating the surface layer with an aqueous solution comprising hydrogen peroxide and an aqueous acetic acid or formic acid solution, wherein the aqueous solution comprises a surface tension depressant,
    wherein the concentration of the aqueous acetic acid or formic acid solution is 21 to 80 wt %; and wherein the mole ratio of hydrogen peroxide to acid is 0.1 to 0.29.

7. A method according to claim 6, wherein treating the surface layer with an aqueous solution comprises applying the aqueous solution onto a portion of the surface layer by immersing the surface in the aqueous solution, by brushing the aqueous solution onto the surface, by applying the aqueous solution to the surface with a spatula or by spraying the aqueous solution onto the surface.

8. A method according to claim 6, wherein the rubber comprises natural rubber or a diene-based synthetic rubber.

9. A method according to claim 6, wherein the aqueous solution comprises an effective amount of the surface tension depressant.

10. A method according to claim 6, wherein the mole ratio of hydrogen peroxide to acid is 0.2 to 0.29.

11. A method according to claim 6, wherein the aqueous solution comprises 0.001 to 0.5 wt. % of a surface tension depressant.

12. A method according to claim 11, wherein the surface tension depressant comprises a surfactant, an alcohol or a thickening agent.

13. A method according to claim 12, wherein the surface tension depressant comprises a sodium pyrophosphate, sodium tripolyphosphate, alkylbenzene sulfonic acid, dialkyl sodium sulfosuccinate, polyoxyethylene alkyl aryl ether or polyoxyethylene non phenyl ether.

14. A method according to claim 12, wherein the surface tension depressant comprises methanol or ethanol.

15. A method according to claim 12, wherein the surface tension depressant comprises a fluorine based surfactant.

16. A method according to claim 12, wherein the surface tension depressant comprises methyl cellulose.

17. A method according to claim 6, wherein the aqueous solution comprises 0.001 to 0.2 wt. % of a surface tension depressant.

18. A method according to claim 17, wherein the surface tension depressant comprises a surfactant, an alcohol or a thickening agent.

* * * * *